United States Patent
Dixit et al.

(10) Patent No.: US 7,019,054 B2
(45) Date of Patent: Mar. 28, 2006

(54) FORMULATION FOR ACHIEVEMENT OF OIL AND GREASE RESISTANCE AND RELEASE PAPER PROPERTIES

(76) Inventors: Ajit S. Dixit, 9 Clearbrook Crossing, Asheville, NC (US) 28803; Melvin G. Mitchell, R.R. #1, Box 91B, Penrose, NC (US) 28766; Jeanette M. Paris, P.O. Box 296, Penrose, NC (US) 28766; Mark J. Andersen, 12 Knob Creek Rd., Pisgah Forest, NC (US) 28768; Christy M. Huggins, R.R. 5 Box 722, Broken Bow, OK (US) 74728

( * ) Notice: Subject to any disclaimer, the term of this patent is extended or adjusted under 35 U.S.C. 154(b) by 0 days.

(21) Appl. No.: 10/344,814

(22) PCT Filed: Aug. 15, 2001

(86) PCT No.: PCT/US01/25555

§ 371 (c)(1),
(2), (4) Date: Jun. 27, 2003

(87) PCT Pub. No.: WO02/14426

PCT Pub. Date: Feb. 21, 2002

(65) Prior Publication Data

US 2004/0005341 A1    Jan. 8, 2004

Related U.S. Application Data

(60) Provisional application No. 60/225,265, filed on Aug. 15, 2000.

(30) Foreign Application Priority Data

Aug. 15, 2001   (US)   ................................. 60312623

(51) Int. Cl.
*C08K 5/3492*    (2006.01)
*C08L 91/06*    (2006.01)

(52) U.S. Cl. ...................... 524/100; 524/275; 524/503; 524/557; 427/391; 427/392; 428/486; 428/511; 162/231; 229/5.84; 229/5.85

(58) Field of Classification Search ............ 524/13–14, 524/275, 503, 100, 487, 557; 427/391–392; 428/486, 511; 162/231; 229/5.84–5.85
See application file for complete search history.

(56) References Cited

U.S. PATENT DOCUMENTS

| | | | | |
|---|---|---|---|---|
| 2,835,639 | A * | 5/1958 | Widmer et al. | 427/393.4 |
| 6,207,258 | B1 * | 3/2001 | Varnell | 428/32.1 |
| 6,379,497 | B1 * | 4/2002 | Sandstrom et al. | 162/123 |
| 6,740,373 | B1 * | 5/2004 | Swoboda et al. | 428/34.2 |

* cited by examiner

*Primary Examiner*—Peter Szekely
(74) *Attorney, Agent, or Firm*—Nanda P. B. A. Kumar; Louis M. Heidelberger; Reed Smith, LLP

(57) ABSTRACT

A formulation, and a process for making same, is disclosed which is useful as a coating or treatment for imparting oil and grease resistance to an underlying substrate. The formulation does not contain any fluorochemicals. At the same time, however, the formulation provides oil and grease resistance properties that are equivalent to known coatings and treatments which contain fluorochemicals, particularly those coatings which are permitted to come into direct contact with food products. Therefore, the formulation of the present invention is ideal for use as a coating for paper and paperboard, including paper packaging such as that utilized in food wrappers, food containers, food receptacles and the like, and for other shaped articles. The formulation is also useful as a coating or treatment for providing release properties to an underlying substrate without the use of silicone. In addition, the present invention relates to the process for making the underlying substrate ideal for holdout of the release coating without excessive fiber refining, as in glassine papers. The formulation is a low solids coating that can be applied on the size press of a paper machine, eliminating the need for a post-machine coating process. The formulation does not include silicone, thereby allowing the release paper to be re-pulped. The wet end additive that provides sheet holdout combines with the release formulation to provide a release paper for pressure sensitive adhesives.

16 Claims, No Drawings

FORMULATION FOR ACHIEVEMENT OF OIL AND GREASE RESISTANCE AND RELEASE PAPER PROPERTIES

This application claims priority pursuant to 35 U.S.C. § 119(e) to U.S. Provisional Application Ser. No. 60/225,265, filed Aug. 15, 2000, and to U.S. Provisional Application Ser. No. (not yet assigned), filed Aug. 15, 2001.

FIELD OF THE INVENTION

The present invention relates to a formulation which provides oil and grease resistance, a process of preparing the formulation, products which have been treated or otherwise prepared with the formulation to provide oil and grease resistant properties, and processes for preparing such products. The formulation can be used as a coating to provide oil and grease resistance on paper and paperboard. More particularly, the formulation and process for preparing same, and the products which are made from or which include the formulation, do not use fluorochemicals, such as fluorocarbons, which heretofore have been utilized in most if not all equivalent commercially-available oil and grease resistant coatings. Some fluorocarbons are no longer desirable for use in coatings such as those used in providing oil and grease resistance on paper packaging, including food wrappers, food containers and the like, as they have recently been found to have deleterious effects on the environment and possibly on human health.

The present invention also relates to a coating formulation for application inline on a paper machine. The formulation does not contain silicone, and yet, provides release properties for the paper as it is delivered from the paper machine. The base sheet does not require a glassine type pore structure. Rather, the surface of the base paper is altered via the addition of a film forming component.

BACKGROUND OF THE INVENTION

Paper, in the form of "boxboard" or "paperboard," has been widely used for such disposable items as drinking cups and containers for liquids, such as milk and fruit juices. For these applications, paper has the advantages of low toxicity, low cost, printability, biodegradability, and the ease with which it may be formed into the required shapes. However, untreated paper is not suitable for the aforementioned applications, because it is permeable to water and other aqueous and non-aqueous fluids.

It is well known in the art to coat materials and substrates with a fluorochemical coating, in order to impart oil and grease resistance to the materials and substrates. For example, Schwartz, "Oil Resistance Utilizing Fluorochemicals," TAPPI, Seminar Notes, 74, 71–75 (1987) discloses the use of commercially available FDA-cleared fluorochemicals to impart resistance to low surface tension fluids on various substrates. U.S. Pat. No. 4,426,466 discloses treatment compositions containing fluorochemical carboxylic acid and epoxidic cationic resin to impart oil and water repellency to cellulosic materials. U.S. Pat. No. 4,529,658 discloses fluorochemical copolymers useful for imparting oil and water repellency to cellulosic and textile materials. U.S. Pat. No. 5,370,919 discloses fluorochemical compositions for imparting oil and water repellency to various substrates.

Two well-known commercially available, fluorochemical-containing products for imparting oil and grease resistance to a substrate are Scotchgard® and Scotchban®, both of which are manufactured by the Minnesota Mining and Manufacturing Co. (3M). Scotchgard®, Scotchban® and other similar commercially-available products have heretofore been applied to a wide variety of goods for purposes of oil and grease resistance, including carpet, clothing, fabric, home furnishings, leather, outerwear, upholstery, automotive fabrics and carpets, film and photographs.

With regard to providing oil and grease resistance to paper, 3M manufactures a product similar to Scotchguard®, under the brand name Scotchban®. Scotchban® is a water soluble fluorochemical sizing agent that imparts grease and oil resistance to paper, paperboard and pigmented coatings. It is believed to presently conform to Food and Drug Administration (FDA) regulations for use in direct contact with non-alcoholic foods under certain prescribed conditions of use. Scotchgard®, Scotchban® and related products have heretofore been widely used by industries such as papermakers and textile mills, who apply the treatments to goods as far-ranging as pet food bags, candy wrappers and carpeting.

Recently, 3M announced that it would stop making many of its well-known Scotchgard® products, after tests revealed that the chemical compound found in such products (PFOS) and in other similar commercially-available products persists in the environment and in the human body for years. The products affected include many Scotchgard® products, such as soil, oil and water repellent products, fire-fighting foams and specialty components for other products. They also include 3M's Scotchban® products and coatings used for oil and grease resistance on paper packaging.

Because PFOS has been found to resist natural processes of decay and can linger in the environment for decades, it falls within the class of chemicals that are notorious for such persistence in the environment, including chlorinated fluorocarbons (CFCs) and polychlorinated biphenyls (PCBs). Government regulations now prohibit the use of either of these chemicals in products, due to their harmful effects on human health and on the environment. CFCs, for example, were found to be causing the destruction of the earth's ozone layer. Other halogenated chemicals of this class cause a wide range of health problems in animals and in people.

While it has been known for some time that PFOS is long-lived, it is only as a result of sophisticated new testing techniques developed in the last few years that the fluorochemicals can be detected in small concentrations in people, as well as in wildlife, water and other areas of the environment. While the studies conducted to date have not demonstrated any hazards to human health from PFOS, it has been shown to be toxic to laboratory animals at high doses. Further, the mere fact that PFOS is a synthetic compound that does not easily degrade raises health concerns. Those concerns, coupled-with the fact that PFOS has been found to accumulate in human and animal tissues, has caused products containing fluorochemicals to be removed from the marketplace and/or discontinued.

U.S. Pat. No. 5,603,996, to Overcash et al. discloses a coated sheet material that includes a porous cellulose substrate sheet material, having a barrier coating thereon which is a blend of a cross-linkable polymer that is resistant to penetration by water moisture when cured and a water-dispersible, film-forming polymer that is resistant to penetration by grease and oil when cured. Disposed on the barrier layer is a release coating, which consists of a fatty acid complex of a metal ion, which is cross-linked to the film-forming polymer in the barrier layer.

Another approach has been to coat a mixture of polyvinyl alcohol and a chrome-fatty acid complex, such as Quilon®, onto a paper substrate. Quilon®, manufactured by the DuPont Company, is a dark, blue-green, chemically reactive, Werner complex in which a C14–C18 fatty acid is coordinated with trivalent chromium in isopropanol solution.

As with the halogen-containing compounds, the use of heavy metals such as chromium, nickel and lead, has raised numerous environmental and health concerns. As such, their use in an oil and grease resistant coating, such as Quilon® or the coating disclosed in U.S. Pat. No. 5,603,996 to Overcash et al, is undesirable, particularly when the coating is one which is to come in direct contact with food products.

Silicone release papers are widely used in the manufacture of layered pressure sensitive adhesive materials or "sandwiches." The release paper is adhered to an adhesive which has been applied to a face sheet of the subject sandwich. When the sandwich is ready for use, the release paper is stripped from the face paper exposing the adhesive. The adhesive can then be used to secure the face paper. This type of technology has found a wide application in, for example, self-adhering envelopes, labels, postage stamps, stickers and the like.

Typically, the silicone required to impart easy and clean release to paper is applied on a gravure coater off line to a typical fourdrinier wet laid paper machine. The resulting process requires additional handling, process losses and costs, even after the paper has been manufactured. The release paper produced in this manner is also rendered unpulpable for future recycle or reuse. Also, the base paper used for silicone treatment requires a high level of cellulose fiber refining and calendering in order to achieve a very tight sheet pore structure (as measured by air porosity). The subject base paper is typically a supercalendered kraft paper or glassine type product For some time papers coated with release agents have been known as release papers. The most common material is silicone, which can be applied using either a solvent-based or water-based process. According to Asia Pulp and Paper, there are at least six categories of base materials that can be used with silicone: polyethylene laminated paper; glassine paper; supercalendered-kraft paper; clay coated paper; water resin coated paper; or even a plastic film instead of paper (Asia Pulp and Paper, Volume 30, Number 3, pages 72–77). These papers are then coated with silicone with an aqueous or an organic solvent-based system. At present the solventless approach has largely been driven by legislation on airborne emissions, but nevertheless, the difficulty of recycling the standard silicone treated release papers will continue to remain a challenge. See, e.g., D. Jones in "Silicone Coated Release Liners" (2000 Recycling Symposium, Washington, D.C., USA, Mar. 5–8, 2000, Volume 1, pages 207–208 Atlanta, Ga., USA: TAPPI Press, 2000).

U.S. Pat. No. 5,962,098 discloses the use of a release liner having a flat base substrate which coated on both sides with thermoplastic polyolefin. On one side, the base substrate has a release coating which forms a release force to adhesives. On the other side, the base substrate has a polymer-bound mineral particle layer. This method includes coating a polyolefin onto the paper substrate, which makes it non-repulpable. U.S. Pat. No. 6,210,767 discloses a release liner carrier web including a paper layer, a release layer including a polypropylene layer coated onto the substrate and a silicone release agent coated onto the polypropylene coating layer. The liner further includes a second coating layer made up of an acrylic resin type material for sealing the paper substrate and preventing curling and contamination of a label or printed film adhesively laminated thereon. Again, this patent discloses a plastic film laminated onto the base paper prior to silicone coating. Not only does this make the release paper non-repulpable, it also involves two post-machine processes: laminating and coating. This adds significantly to the cost of the process as well as non-repulpable waste.

U.S. Pat. No. 6,001,473 discloses a release agent made from a starch ester and a plasticizer: "Now it has been found that release coating compositions made from selected starch esters provide good release properties as well as being biodegradable and environmentally friendly making them particularly useful in paper applications where repulpability and recyclability are desired." Therefore, a repulpable release paper can be produced with the right coating.

Commercial release coatings usually provide two functions to the paper to which they are applied: release and solvent resistance. Since many pressure-sensitive adhesives contain solvents such as toluene, a release coating must have solvent resistant functionality. Without this resistance, the adhesive will migrate into the release paper, inhibiting release. Polymers such as vinyl acetate, vinyl acrylic, acrylic and acrylonitrile exhibit such solvent resistance. The other part of a release coating would be the release component, which may be a silicone or non-silicone organic polymer. Silicone release agents include silicone homopolymers, silicone copolymers, and a blend of the first two. Non-silicone release agents can be either an olefin, a polymer with a long-chain alkyl group, or a fluorine based polymer (Asia Pulp and Paper, Volume 30, number 3, pages 72–77). Usually, both silicone and non-silicone coatings require application after the paper machine with a coater using gravure, blade, rod or air knife technology. Coatings usually need to be high solids, with a high web temperature following to set the release coating. In other cases, some release agents need ultraviolet (UV) or electron-beam (EB) curing after the web dries.

As stated above, the base sheet for the release coating is critical for the release property. Methods involving lamination of a plastic film onto the base paper would render the release paper non-repulpable. Glassine and supercalendered kraft papers are widely used as a release base. Both types of sheets involve high levels of refining on wood pulp fibers prior to papermaking. Refining of wood pulp fibers cuts and collapses the structure of the fibers, causing the fibers to form into a strong, dense structure. The porosity of the resulting sheets is minimal with good sheet smoothness. However, a significant amount of energy is consumed in the process of refining these fibers. The resultant paper web is also difficult to dry in a standard Fourdrinier paper machine due to the density of the sheet This leads to slower machine speeds and increased production costs.

In addition, heavy refining affects the dimensional stability of the release sheet, which could affect runnability of the release sheet. A recent article disclosed that "[t]he impact of runnability on production performance at the customer end dictates the necessity of having a release paper that consistently performs without curling or welting, regardless of the demands of the production environment. Low-density liner (LDL) products combine the surface holdout feature of conventional super-calendered kraft with lower internal-fiber density. The resulting product is lower in basis weight at a standard caliper and is also much less subject to curl after laminating to film or paper facestocks. While there is not a wide array of LDL products currently available, the market seems to hold promise from a growth standpoint The less-demanding die-cutting requirements for the electronic data processing market hold the most promise for LDL products." *Release Papers: New Trends Are Driving the Market*, Tardiff, Bob: Plainwell Paper Inc., Paper Film Foil Converter 74, no. 6: 2 PP, June 2000. Therefore, highly refined, high-density release sheets can be susceptible to curl and runnability problems. A lower density release sheet with holdout properties would be preferred in some release applications.

Therefore, the need exists for a formulation which is resistant to oil and grease, and which can be used as a coating or treatment for products for which oil and grease resistance is desired. In particular, the need exists for a formulation which is resistant to oil and grease for products that come into direct contact with food, such as paper packaging, wrappers and containers for food products and the like, but which does not make use of or otherwise contain fluorochemicals.

The need also exists for a moderately dense release sheet with holdout properties that can be coated with a repulpable release coating to provide better release than commercial non-silicone release coatings. In particular, the need exists for a wet end chemistry that maximizes holdout of a low solids release coating that incorporates both a solvent resistant agent and an organic release agent

SUMMARY OF THE INVENTION

The present invention relates to a formulation, and a process for making same, which is useful as a coating or treatment for imparting oil and grease resistance to an underlying substrate. The formulation does not contain any fluorochemicals. At the same time, however, the formulation provides oil and grease resistance properties that are equivalent to known coatings and treatments which contain fluorochemicals, particularly those coatings which are permitted to come into direct contact with food products. Therefore, the formulation of the present invention is ideal for use as a coating for paper and paperboard, including paper packaging such as that utilized in food wrappers, food containers, food receptacles and the like, and for other shaped articles.

The present invention also relates to a formulation, and a process for making same, which is useful as a coating or treatment for release properties to an underlying substrate without the use of silicone. In addition, the present invention relates to the process for making the underlying substrate ideal for holdout of the release coating without excessive fiber refining, as in glassine papers. The formulation is a low solids coating that can be applied on the size press of a paper machine, eliminating the need for a post-machine coating process. The formulation does not include silicone, thereby allowing the release paper to be re-pulped. The wet end additive that provides sheet holdout combines with the release formulation to provide a release paper for pressure sensitive adhesives.

DETAILED DESCRIPTION OF THE INVENTION

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

The present invention relates to a novel formulation which provides oil and grease resistance when applied to an underlying substrate, and which does so without the use of any fluorochemicals. Further, the formulation of the present invention does not contain any heavy metals, such as lead, nickel or chromium. It has been surprisingly found that the formulation of the present invention—in addition to achieving oil and grease resistance without the use of fluorocarbons—also provides release effects against other materials. In combination with a wet end additive, the formulation of the present invention provides release properties to a moderately refined paper sheet, and does so without the use of silicone. Further, the formulation of the present invention allows production of the release paper without a post-machine coating process.

The present invention also relates to a process for preparing the formulation, to products which are made from or which otherwise include the formulation, and to processes for preparing such products. Substrates treated with the formulation (such as fibrous sheets) and shaped articles made therefrom (such as paper products) are also disclosed.

The formulation has a wide variety of uses and applications. It can be applied as a treatment or coating to a fibrous sheet or other substrate, such as paper and paperboard, to provide resistance to oils, greases, solvents, fats and waxes or to provide release properties (or both). At the same time, the formulation of the present invention has significant positive effects on other paper properties such as wet tensile, burst, dry tensile strength, porosity, gloss, density, stiffness and surface strength. Printability and glueability are generally improved. The addition of the formulation of the present invention does not affect the recyclability of the paper or paperboard being treated, nor does the accompanying wet end additive in instances where release properties are desired.

As has been described above, in one embodiment the present invention involves sheets which may be defined as "paper" sheets. The sheets can be made using standard papermaking techniques and chemistry. The term "paper" refers to a web structure which contains cellulose and optionally other additives and is produced on continuous conventional papermaking apparatus. Examples of sheets which are beyond the meaning of "paper," but are included within the broad scope of the invention, may include for example, such things as extruded film, thermoset laminates, woven substrates, injection molded substrates and the like. The present invention includes paper derived from any of the common pulping processes, including mechanical, thermomechanical hybrid and chemical. Paper made by one of the variations of the kraft process is most commonly used in paperboard. Paper which contains fibers other than cellulose is also within the scope of the present invention. For example, it is well known that a combination of a minor amount of cellulose acetate fibers and a major amount of natural cellulose can be used to prepare paper products. Fibers such as fiber glass, polyester, kevlar, rayon and cotton can be used in the present invention.

According to G. A. Smook, "Handbook for Pulp and Paper Technologists," 2nd ed., p. 297, paperboard can be loosely defined as "stiff and thick paper," but the ISO has set the specification for paperboard at 224 g/m$^2$ or more, while lighter stock is referred to as "paper." Various categories of paperboard which are applicable to this invention include, for example, linerboard, foodboard and folding boxboard (carton board).

As is shown in Table 1, the formulation of the present invention provides oil and grease resistant properties which are similar to commercially-available coatings and the like currently in use which contain fluorochemicals. The absence of fluorochemicals and heavy metals in the formulation of the present invention makes it an excellent substitute or replacement for such coatings, particularly in applications where the oil and grease resistant material will come in direct contact with food products, including, for example, items such as cartons, trays, bags, labels, coupons, wraps, laminates and corrugated containers.

TABLE 1

Physical Properties of Formulation of Present Invention vs. PFOS Treated Papers

| | Ecusta RD 99975 | Commercial confectionery sample treated with Scotchban ® |
|---|---|---|
| Basis Weight (g/m$^2$) | 37.0 | 39.0 |
| Burst (lbs/in$^2$) | 35.6 | 17.3 |
| Density (g/cm$^3$) | 0.889 | .990 |
| Fold (g) | 1000+ | 640 |
| Photosize (sec) | 0.5 | 3.3 |
| Pick | 23+ | 22 |
| Porosity (Sheffield, 3/4") | 7 | 10 |
| Smoothness (Sheffield) | 109/142 | 28/35 |
| Stiffness (g) | 11.86 | 13.34 |
| Stretch (%) | 2.44 | 1.50 |
| Tear (g) | 37 | 41 |
| Tensile, dry (kg/cm$^3$) | 13.27 | 8.73 |
| Tensile, wet (kg/cm$^3$) | 7.3 | 1.23 |
| Thickness (mm) | 0.0416 | 0.0394 |
| Thickness (mils) | 1.64 | 1.55 |
| Coefficient of Friction | 15 | 9.7 |
| Ash (%) | 0.3 | 1.4 |
| 3M KIT Value | 6 | 9+ |

The formulation of the present invention along with the wet end additive provides release properties similar to that of commercially-available silicone and non-silicone release compounds. The absence of silicone in the formulation of the present invention makes it an excellent substitute for such commercial coatings that are not re-pulpable. The wet end additive also allows a lower density paper substrate without diminishing the release capability, giving a release sheet that is more dimensionally stable and less likely to curl. The present invention can be utilized in a variety of applications, such as, for example, pressure sensitive tapes, self-adhering envelopes, stamp backing, sticker backing and label stock.

The formulation of the present invention may also be used in connection with other applications and in other environments, including but not limited to textiles, non-woven materials and leather. Any suitable process may be used for applying the formulation to the product to be treated, and will vary depending upon the nature of the product being treated and the desired result.

The following discussion describes the present invention in the context of an oil and grease resistant coating or a release coating (or both), for paper and paperboard. It should be understood that this merely sets forth one embodiment of the present invention, and is not intended to be limiting in any way. Obviously, the present invention can be modified and used in a variety of different ways, and in a variety of different applications. For example, the substrate or other material to which the formulation of the present invention may be applied or otherwise added is not limited to fibrous sheets. Similarly, the shaped articles which may be formed from the oil and grease resistant material are not limited to food wrappers, containers or receptacles.

In one embodiment, a paper composition is provided which comprises a web and a solution. In a preferred embodiment, the web comprises cellulose fibers, although the web may also comprise synthetic fibers, or a mixture of cellulose and synthetic fibers. The cellulose used to prepare the paper may be conventional papermaking cellulose obtained from wood, cotton, hemp, bagasse, straw, flax and other plant sources. The cellulose fibers utilized in the invention are typically standard hardwood and softwood pulp fibers. A solution, comprising the formulation of the present invention, is then applied to the web, resulting in a paper composition which possesses oil and grease resistant properties.

Where release properties are desired, a wet end additive that provides water holdout is added along with the fibers to make a web with holdout properties. A solution, comprising the formulation of the present invention, is then applied to the web, resulting in a paper composition which possesses release properties.

The wet end additive comprises an alkaline sizing agent such as alkyl ketene dimer (AKD) or alkyl succinic anhydride (ASA) in a water-based emulsion with fatty acids. An example of a commercially available AKD size is Hercon 118, available from Hercules Inc. of Wilmington, Del. Conversely, the wet end additive can also be an anionic water dispersible polyester polymer with an enhanced nonpolar character. Such a polymer dispersion is commercially available as EvCote PWR-25 aqueous dispersion from EvCo Research, Inc. of Atlanta, Ga. The polyester polymer and alkaline sizing agent may be used separately or together in the present invention.

The formulation includes a fatty acid melamine and paraffin wax emulsion and a polyvinyl alcohol. Alternatively, the formulation includes a fatty acid melamine wax and a polyvinyl alcohol. The fatty acid melamine wax component employed in accordance with this invention may be any fatty acid melamine wax that is compatible with polyvinyl alcohol and that causes the formulation, when applied to a substrate such as a cellulose web or fibrous sheet, to possess improved oil and grease resistance or improved release properties (or both). It may be derived from any long-chain fatty acid (saturated or unsaturated). The fatty acid melamine wax is preferably derived from stearic acid, oleic acid, or palmitic acid. The more preferred fatty acid melamine wax is a stearylated melamine wax.

An example of a commercially-available stearylated melamine wax is Sequapel® 414G, available from Omnova Solutions, Inc. of Chester, S.C. Sequapel® 414G is a white, fluid, water-based emulsion that has been FDA approved for surface treatments that contact dry, fatty and aqueous foods. As supplied, it is anionic in nature, and has a pH of around 8.5–9.0, a specific gravity (20° C.) of about 1.0, a bulk density of about 8.4 lbs./gallon, and a viscosity of less than 100 cps (#2 spindle, 100 rpm).

Similarly, any suitable polyvinyl alcohol may be used for that component of the formulation Polyvinyl alcohol is a white, granular water-soluble resin manufactured by polymerizing vinyl acetate and hydrolyzing the resultant polymer to form an alcohol. Polyvinyl alcohol is a straight-chain polymer with secondary hydroxyl groups on alternate carbons in the chain. Polyvinyl alcohol grades vary in molecular weight (degree of polymerization) and in degree of hydrolysis. The molecular weight depends on the conditions of polymerization, and the degree of hydrolysis is determined by the percent of acetate groups replaced by hydroxyl groups during the hydrolysis reaction. The specific gravity of polyvinyl alcohol solutions depends on concentration and temperature and is independent of grade. Polyvinyl alcohol reacts in a manner similar to secondary alcohols.

The polyvinyl alcohol employed in accordance with this invention may be any grade polyvinyl alcohol that is compatible with fatty acid melamine waxes and that causes the solution, when applied to a substrate such as a cellulose web or fibrous sheet, to possess improved oil and grease resistance or improved release properties (or both). In the preferred embodiment, the polyvinyl alcohol component comprises an intermediately hydrolyzed polyvinyl alcohol with a medium molecular weight. The physical properties of polyvinyl alcohol are controlled by molecular weight and the degree of hydrolysis, and a wide range of grades is offered by polyvinyl alcohol manufacturers. Hydrolysis and molecular weight can be independently controlled in the manufacturing process, so as to provide the desired property balance for different applications.

All polyvinyl alcohol manufacture involves polyvinyl acetate as the starting material. Conversion of polyvinyl acetate to polyvinyl alcohol is generally accomplished by base-catalyzed methanolysis; sodium hydroxide is the usual base. Polyvinyl acetate polymerization is done by conventional processes such as, for example, solution, bulk or emulsion polymerization The polymerization step controls the ultimate molecular weight of the polyvinyl alcohol. Catalyst selection, temperature and solvent control the degree of polymerization.

The degree of hydrolysis of polyvinyl alcohol is controlled during the alcoholysis reaction and is independent of molecular-weight control. Fully hydrolyzed polyvinyl alcohol is obtained if methanolysis is allowed to go to completion. The reaction can be terminated by neutralizing or removing the sodium hydroxide catalyst. The addition of small amounts of water to the reactants promotes saponification of polyvinyl acetate, which consumes sodium hydroxide. The extent of hydrolysis is inversely proportional to the amount of water added.

An example of a commercially-available polyvinyl alcohol which is intermediately hydrolyzed and which possesses a medium molecular weight is Airvol® 425, available from Air Products Co., of Allentown, Pa. Airvol® 425 possesses properties between the fully and partially hydrolyzed grades of polyvinyl alcohol. It has a strong affinity for hydrophilic surfaces such as cellulosics.

Commonly used fully and super hydrolyzed grades of polyvinyl alcohol are generally used without defoamers, whereas intermediate and partially hydrolyzed grades nearly always require a defoamer. This is due to the tendency for polyvinyl alcohol to generate foam, which is highly dependent upon the degree of hydrolysis, and, to a lesser extent, on the mechanical dynamics unique to each preparation and each end-use process.

A borated polyvinyl alcohol may also be used with fully hydrolyzed and superhydrolyzed grades of polyvinyl alcohols, that provide crosslinking and a tougher film forming ability on the paper surface. If a borated polyvinyl alcohol is used, the pH of the solution should generally not be permitted to fall below 5.5, although a lower pH may be used in the case of paraffin type wax.

The relative weight percentages of the polyvinyl alcohol and fatty acid melamine wax components of the formulation can be adjusted to accommodate the particular product being treated, the particular application method, and/or the desired end result to be achieved by treating the product with the formulation. The amount of polyvinyl alcohol preferably ranges from about 20% by weight to about 95% by weight of the formulation, more preferably from about 40% by weight to about 90% by weight, and most preferably from about 60% by weight to about 80% by weight, based upon the total weight of the formulation. Correspondingly, the amount of the fatty acid melamine wax component preferably ranges from about 5% by weight to about 80% by weight, more preferably from about 10% by weight to about 60% by weight, and most preferably from about 20% by weight to about 40% by weight, based upon the total weight of the formulation In a particularly preferred embodiment wherein improved oil and grease resistance is desired, the formulation comprises from about 90% by weight polyvinyl alcohol to about 10% by weight fatty acid melamine wax. In a particularly preferred embodiment wherein improved release properties are desired, the formulation comprises from about 37% by weight polyvinyl alcohol to about 63% by weight fatty acid melamine with paraffin wax.

When improved release properties are desired such that an alkaline sizing wet end additive is incorporated into the process, the relative weight percentages of the wet end additives can be adjusted to accommodate the particular product being treated, the particular application method, and the desired end result to be achieved by treating the product with the formulation. The alkyl ketene dimer (AKD) component of the alkaline sizing wet end additive may comprise anywhere from 0% to 100% of the total wet end alkaline sizing additive, and the anionic water dispersible polyester polymer may comprise anywhere from 0% to 95% of the total wet end alkaline sizing additive. The alkaline sizing wet end additives may comprise anywhere from about 0.1% to 3.0% by weight of the paper composition (the remaining weight percentage being attributed to the web). In a preferred embodiment, the solution comprises from about 0.2% by weight to about 2% by weight, and in a more preferred embodiment, from about 0.3% to about 1.5% by weight.

As with the ratio of polyvinyl alcohol to wax in the formulation, the amount of formulation which is applied to the substrate (such as a fibrous web or sheet) to form the oil and grease resistant material or the release material (or both) can be adjusted to accommodate the particular product being treated, the particular application method, and/or the desired end rest to be achieved by treating the product with the formulation. The formulation is applied in a sufficient amount so as to provide the desired level of oil and grease resistance or release properties (or both). Preferably, the treated or coated material comprises from about 0.5% by weight to about 10% by weight formulation, and from about 90% by weight to about 99.5% by weight web, based upon the total weight of the formulation and the substrate or other underlying material which form the sheet or paper composition. More preferably, the treated or coated material comprises from about 1% by weight to about 8% by weight of formulation, and from about 92% to about 99% by weight substrate. Most preferably, when oil and grease resistance is primarily desired, the treated or coated material comprises from about 2% to about 6% by weight formulation, and from about 94% by weight to about 98% by weight substrate. When the primary desire is increased release properties, the treated or coated material most preferably comprises from about 5% to about 7% by weight formulation, and from about 93% by weight to about 95% by weight substrate.

A filler may be contained in or added to the web, if desired. The fillers may be any of those which are conven tionally used in the papermaking industry for making a sheet of paper opaque, such as titanium dioxide, clay, calcium carbonate, aluminum oxide and aluminum trihydrate. The filler may be present anywhere from about 0% by weight to about 25% by weight, based on the total weight of the web, the solution and the filler. The addition of a filler would lower the weight percentage attributed to the web. For example, a sheet that without filler is 10% by weight solution and 90% by weight web, could have a filler added to it. If the filler were added in the amount of 25% by weight, the make-up of the web would change to 10% by weight solution, 65% by weight web and 25% by weight filler.

A lubricant may also be contained in or added to the web. An example of a commercially available lubricant which may be used is Sunkem® 301, available from Omnova Solutions, Inc. of Chester, S.C. Sunkem® 301 is an aqueous polyethylene emulsion, which has a white liquid appearance. As supplied, it has a pH of around 9.5, a specific gravity (20° C.) of about 1.0, a bulk density of about 8.34 lbs./gallon, and a vapor density (Air=1) of about 0.62 (Water).

Although it is not necessary in the broadest embodiment of the invention, in a preferred embodiment of the invention a suitable defoaming agent can be added to the solution to control foaming of the polyvinyl alcohol component. Similarly, a minor amount of an approved antimicrobial agent could be useful to control or prevent the development of mold and/or fungus in or on certain paper products in which the solution is used. Further, other materials typically employed in papermaking can also be present, such as, for example, sizes, other synthetic fibers, starch and various chemical modifiers, such as wet strength enhancers, dry strength enhancers and coatings.

It has been surprisingly found that the components of the formulation of the present invention have a synergistic effect. That is, the combination of the polyvinyl alcohol and fatty acid melamine wax provides enhanced oil and grease resistance, than the same properties provided by each of the individual components, standing alone. Similarly, the same combination of polyvinyl alcohol and fatty acid melamine wax also provides enhanced release properties as compared to what each of the individual components would provide, standing alone. Finally, it was surprising surprisingly to find that the formulation of the present invention—in addition to achieving oil and grease resistance without the use of fluorocarbons—also provides release effects against other materials, and does so without the use of silicone. This is demonstrated in the examples below.

The formation of the web and the solution, and the application of the solution to the web to form an oil and grease resistant paper sheet (or release paper sheet) can be accomplished in accordance with any conventional papermaking techniques using conventional papermaking equipment. Each step can be accomplished by a variety of methods well known in the art, and can vary widely depending upon the particular papermaking process employed, and the particular application technique utilized. Any suitable process steps for practicing the method of the present invention may be used.

For example, in the papermaking process a diluted slurry of cellulose fibers is prepared into a paper using conventional papermaking equipment. In the next step of the process the paper is dewatered using conventional papermaking equipment. The term "dewatering" means removing the water from the paper by means of drainage or pressing operations applied to the paper by conventional papermaking methods. The dewatering can include drainage on a Fourdrinier, cylinder machine, multi-wire former, roto-former and pressing by various felted wet press designs. During the dewatering step the paper is formed into a sheet of consolidated fibers which, upon drying, can be processed into dry roll or sheet form.

The simplest in conception with regard to the possible papermaking processes is the conventional Fourdrinier paper forming machine. The main standard components of the Fourdrinier forming unit are the headbox and the forming table, including dewatering elements and equipment for improving formation. The function of the headbox is to provide a level and stable jet across the width of the Fourdrinier machine and to produce a well-dispersed fibrous suspension. The Fourdrinier machine disperses the components in the fibrous suspension uniformly, and then removes the water from the fibrous suspension. Therefore, a sheet of paper is simply a dispersion of components. A paper machine, in its entirety, comprises a headbox, a Fourdrinier table, a press section in which water is squeezed out, and a dryer section.

The headbox is supplied with stock from a fan pump and the duty of which is to supply an even level flow of fibrous suspension at a known velocity onto the forming screen of the Fourdrinier machine or a twin-wire former or onto a rotary former, such as a short former. The term headbox is also used for a supply box used for feeding the fibrous suspension to the vat of a cylinder mould machine.

For example, cellulose fibers may first be mixed, in slurry form, in a hydrapulper. Conventional fillers may be added to the mixture as desired. The mixture is then forwarded to a refiner chest and then to the headbox of a Fourdrinier machine. The web of wet fibers or ply, after it leaves the headbox, is then forwarded to a press section, then to a first dryer section, then to a size press, and then to a second dryer section, and then to a calendar stack, if calendaring is desired, to complete the papermaking process. As previously mentioned, these sections are conventional parts of a paper machine, and the process steps can vary depending upon the particular paper machine utilized.

According to the process of the present invention, the formulation may be added at the size press. A conventional size press operates by using rollers. A first roller runs through a bath containing the formulation in a desired concentration, and then that roller meters it onto a separate roller, which then meters it onto the ply or fibrous web. In the present invention, the preferred method of applying the formulation is by spraying it onto the web at the size press. Of course, the formulation may be applied to the web by other means in addition to, or in place of, the aforementioned means, such as dip coating. Further, any of the conventional size press configurations known in the art may be used.

The formulation may also be applied at various other points in the papermaking process in addition to at the size press. For example, it may be applied at the calendar water box, or by means of surface coaters such as blade, air knife and rod.

Regarding the drying section of the paper machine, any of the different types of conventional dryers can be used. For example, standard drum dryers can be used, which may be felted or not felted. A flat dryer can be used, where the sheet runs back and forth over rollers and convention air flows through it. Infrared drying can be utilized, as well as gas fired dryers.

The oil and grease resistant material or release paper sheet may be formed into an infinite number of shaped articles, using any means known in the art. The variety of products with which the formulation of the present invention could be used to provide oil and grease resistant properties is infinite. For example, the oil and grease resistant material may be used to make a container (which, as such term is used herein, refers to any form of container or any size or shape, regardless of whether such container fully encloses or only partially encloses an item placed therein) for storing food on a shelf (such as for storing pet food) while preventing penetration of oil and grease through the material. Likewise, the oil and grease resistant material may be used to form a food receptacle (which, as such term is used herein, refers to any surface for receiving or placing food), such as a paper plate. Or the oil and grease resistant material may be used for fast-food containers (such as boxes for fried chicken) or food wrappers (such as wrapping materials for hamburgers and sandwiches). Thus, the oil and grease resistant material may be used for any of a variety of applications as a food container, wrapper or receptacle.

More specifically, and in no way intending to limit the scope of the present invention in any way, the present invention could be used to provide oil and grease resistance to: consumer bags (for items such as cookies and other products containing shortening); labels that are applied to food containers (to preserve the appearance of the label paper should oil or grease come into contact with it); coupons, such as those which are inserted directly into high-shortening content foods, such as powdered cake mix and the like; form-and-fill packages; paper plates; corrugated containers, such as for bulk shipments of oily products (including food items, such as nut meats, snack foods, meat, or non-food items, such as hardware) or shipping containers for products such as oleomargarine and cooking oils; carry-out food packaging (such as bags or wraps for donuts, french fries and pizzas, and cartons for difficult-to-package fast foods, such as fried chicken); perishable bakery goods packaging; candy packages (such as candy wrappers and candy boxes); plastic-coated papers; copy papers; non-woven materials (such as hospital and medical applications, including drapes and gowns, wraps, and packages for medical devices that are to be steam or ethylene oxide sterilized, as well as non-medical applications, such as food service apparel, service station uniforms, laboratory coats and aprons).

The variety of products with which the formulation of the present invention could be used to provide release properties is also infinite. For example, and in no way intending to limit the scope of the present invention in any way, the present invention could be used to provide release properties to: stamp backing (for self-adhesive stamps with pressure sensitive adhesives that retain adhesive character after peeling from release paper); self-adhering envelope liners (the paper liner that protects the pressure sensitive adhesive on the self-sealing envelope); label backing (self-adhesive labels that easily peel off the liner as in the case of the stamp backing); and many other wrappers and liners that require release properties.

While the application of the formulation has been discussed above in the context of a coating, it should be understood that the formulation of the present invention can be applied to a material or substrate using any known techniques, including application by mills at a size press, spray bar, coaters (blade, rod, roll, air knife), calendar stack, gravure rollers, as an internal ("wet end") treatment or as an additive to coating materials, depending on end-use needs. It may also be applied by converters on rotogravure, flexographic, coating and corrugating equipment, and the like.

Applying a solution to a web or sheet of paper at the size press is an old and common process, as hereinbefore set forth. The particular parameters of the size press will vary depending upon the thickness of the resultant paper which is desired, as well as the amount of surface resistance to oil and grease desired or release properties (or both) which may be desired. Establishing the requisite parameters is essentially done on a "trial-and-error" basis, until the desired levels of thickness, oil and grease resistance, and/or release properties are achieved.

The following example sets forth one embodiment of the method by which the formulation of the present invention can be produced, and is not intended to be limiting in any way.

EXAMPLE 1

250 milliliters of Hercules Advantage Defoamer were added to 1100 gallons of water. In the make-up tank, 667 pounds of Vinol 425 were dissolved in the water and allowed sufficient time for mixing. The mixture was then heated with live steam to 200 degrees Fahrenheit, and held with agitation at temperature for 45 minutes, following which dyes were added, as well as 400 milliliters of a biocide (Nalco 7647 Biocide). The steam was turned off and 105 gallons of Sequapel® 414G stearylated melamine wax emulsion were added, followed by the addition of 20 gallons of Sunkem® 301 polyethylene emulsion (to serve as a lubricant). The solution should not be heated with live steam after the fatty acid melamine wax and lubricant have been added, as the steam could potentially break down the emulsions. The solution was then diluted with water to a final volume of 2,000 gallons. It was applied at the size press inside the temperature range of 120–140 degrees Fahrenheit.

EXAMPLE 2

A sheet of paper was prepared utilizing conventional paper-making procedures. The sheet of paper had a basis weight of 37 $g/m^2$ and contained no filler. Polyvinyl alcohols from Air Products in combination with ethylated starch and stearylated melamine wax were evaluated on paper (37 $g/m^2$ basis weight; no filler), that had been heavily refined. The polyvinyl alcohols evaluated varied in molecular weight and degree of hydrolysis, ranging from super, fully hydrolyzed, intermediate and partially hydrolyzed grades. The viscosity ranged from Low (14–17 cps); Medium (28–32 cps) and High (62–72 cps). The base paper Ecusta Reference 60737 was treated on a Pilot size press with the solutions described in Example 1. Standard Kit values, as measured by the 3M Kit Test, which is equivalent to TAPPI (Technical Association of the Pulp and Paper Industry) Useful Method 557, were performed on the treated paper, according to the standard procedure. The results indicate that there is a synergistic effect due to the combination of polyvinyl alcohol and the stearylated melamine wax that enhances the Kit value compared to the kit values obtained from individual components (see Table 2). This provides improved oil and grease resistance barrier on the paper. The paper thus produced was inspected and found to be suitable for use as a food packaging paper for food and confectionery products.

TABLE 2

Varied Formulation Impact on Oil and Grease Resistance as Measured by KIT Test - Base Paper 60737 (Commercial confectionery sample)

| Treatment | % Solids | PVA:Starch Ratio or PVA:Wax Ratio | KIT Value |
|---|---|---|---|
| 60737 Base Paper | 0 | 0:0 | 1 |
| Penford 280 Ethylated Starch | 6 | 0:100 | 3 |
| Airvol 125 | 6 | 100:0 | 3 |
| Airvol 125 + Penford 280 | 6 | 25:75 | 3 |
| Airvol 165 | 6 | 100:0 | 3 |
| Airvol 165 + Penford 280 | 6 | 25:75 | 3 |
| Airvol 103 | 6 | 100:0 | 3 |
| Airvol 103 + Penford 280 | 6 | 25:75 | 3 |
| Airvol 107 | 6 | 100:0 | 3 |
| Airvol 107 + Penford 280 | 6 | 25:75 | 3 |
| Airvol 325 | 6 | 100:0 | 3 |
| Airvol 325 + Penford 280 | 6 | 25:75 | 3 |
| Airvol 425 | 6 | 100:0 | 3 |
| Airvol 425 + Penford 280 | 6 | 25:75 | 3 |
| Airvol 540 | 6 | 100:0 | 3 |
| Airvol 540 + Penford 280 | 6 | 25:75 | 3 |
| Sequapel 1415 Fluorocarbon | 8 | 0:100 | 12 |
| Sequapel 414G | 2 | 0:100 | 3 |
| Sequapel 414G | 8 | 0:100 | 3 |
| Airvol 425 + Sequapel 414G | 6 | 90:10 | 6+ |

EXAMPLE 3

A continuous web of paper was prepared using a standard fourdrinier paper machine. Critical parameters for this paper machine trial include porosity, coefficient of friction/slip and moisture (for runnability and cupability in converting into cups) in addition to oil and grease resistance and color for the consumer end use. Oil and grease resistance (OGR) and slip will be controlled by the size press solution. Moisture was run at 6% for forming the paper into a confectionery cup. Once again a paper suitable for use as a food packaging paper for food and confectionery products was produced.

Table 3 demonstrates the effect on various properties caused by changing the solids level of the polyvinyl alcohol component. The base paper Ecusta Reference 99975 was sized with various different formulations (designated as HP1, HP4, HP2 and HP3). The designation HP0 refers to the untreated base paper having no formulation applied to it.

Table 4 demonstrates the effect on various properties caused by changing the ratio of polyvinyl alcohol to wax. The base paper Ecusta Reference 99975 was sized with various different formulations (designated as HP1, HP5, HP6 and HP7). The designation HP0 refers to the untreated base paper having no formulation applied to it.

TABLE 3

Effect of PVA Solids Level on Paper Properties Sample RD 99975

| | HP0 | HP1 | HP4 | HP2 | HP3 |
|---|---|---|---|---|---|
| Ingredient | | | | | |
| Advantage 1251 | 0.00 | .033 ml | .033 ml | .033 ml | .033 ml |
| Airvol 425 | 0.00 | 40 g | 30 g | 20 g | 10 g |
| Nalco 7647 | 0.00 | .05 ml | .05 ml | .05 ml | .05 ml |
| Sequapel 414G | 0.00 | 52.5 ml | 39.36 ml | 26.25 ml | 13.12 ml |
| Sunkem 301 | 0.00 | 10 ml | 7.5 ml | 5 ml | 2.5 ml |
| Total Volume (ml) | 0.00 | 1000 ml | 1000 ml | 1000 ml | 1000 ml |
| PVA SOLIDS (%) | | 4.0 | 3.0 | 2.0 | 1.0 |
| Properties | | | | | |
| Basis Weight (g/M$^2$) | 38.2 | 39.3 | 40.0 | 38.4 | 39.2 |
| Burst (lbs/in$^2$) | 26.0 | 30.2 | 31.5 | 28.8 | 27.2 |
| Density (g/cm$^3$) | 0.571 | 0.593 | 0.627 | 0.595 | 0.620 |
| Fold (g) | 2210 | 1830 | 1810 | 2373 | 1520 |
| Photosize (see) | 0.0 | 1.4 | 1.0 | 2.5 | 1.5 |
| Pick | 18.0 | 18.0 | 18.0 | 18.0 | 18.0 |
| Porosity (Sheffield 3/4") | 610 | 545 | 518 | 547 | 524 |
| Stiffness (g) | 35.9 | 37.2 | 32.6 | 34.8 | 27.9 |
| Stretch (%) | 1.8 | 2.0 | 1.9 | 2.0 | 1.8 |
| Tear (g) | 28.0 | 26.0 | 27.0 | 29.0 | 27.0 |
| Tensile,dry (kg/3 cm) | 13.4 | 13.9 | 13.5 | 13.9 | 12.8 |

TABLE 3-continued

Effect of PVA Solids Level on Paper Properties
Sample RD 99975

|  | HP0 | HP1 | HP4 | HP2 | HP3 |
|---|---|---|---|---|---|
| Tensile, wet (kg/3 cm) | 1.6 | 4.34 | 5.20 | 3.60 | 2.90 |
| Thickness (mils) | 1.56 | 2.61 | 2.51 | 2.54 | 2.49 |
| 3M KIT | <3 | 6.0 | 3.0 | <3 | <3 |
| Coefficient of Friction | 19.2 | 15.0 | 14.4 | 13.1 | 15.6 |
| Gloss | 2.1/1.9 | 2.0/2.0 | 2.0/2.0 | 2.0/2.4 | 2.3/2.3 |

TABLE 4

Effect of PVA/Wax Ratio on Paper Properties
Sample RD 99975

|  | HP0 | HP1 | HP5 | HP6 | HP7 |
|---|---|---|---|---|---|
| Ingredient |  |  |  |  |  |
| Advantage 1251 | 0.00 | .033 ml | .033 ml | .033 ml | .033 ml |
| Airvol 425 | 0.00 | 40 g | 40 g | 40 g | 40 g |
| Nalco 7647 | 0.00 | .05 ml | .05 ml | .05 ml | .05 ml |
| Sequapel 414G | 0.00 | 52.5 ml | 105 ml | 133 ml | 200 ml |
| Sunkem 301 | 0.00 | 10 ml | 10 ml | 10 ml | 10 ml |
| Total Volume (ml) | 0.00 | 1000 ml | 1000 ml | 1000 ml | 1000 ml |
| PVA/WAX RATIO |  | 1.90 | 0.95 | 0.75 | 0.50 |
| Properties |  |  |  |  |  |
| Basis Weight (g/M$^2$) | 38.2 | 39.3 | 40.3 | 40.7 | 40.9 |
| Burst (lbs/in$^2$) | 26.0 | 30.2 | 28.2 | 33.8 | 34.7 |
| Density (g/cm$^3$) | 0.571 | 0.593 | 0.594 | 0.623 | 0.641 |
| Fold (g) | 2210 | 1830 | 1746 | 1248 | 1855 |
| Photosize (sec) | 0.0 | 1.4 | 1.8 | 1.0 | 1.0 |
| Pick | 18.0 | 18 | 18 | 20 | 20 |
| Porosity (Sheffield 3/4") | 610 | 545 | 428 | 455 | 396 |
| Stiffness (g) | 35.9 | 37.2 | 32.6 | 34.8 | 27.9 |
| Stretch (%) | 1.8 | 2.0 | 2.0 | 2.2 | 2.3 |
| Tear (g) | 28.0 | 26.0 | 30.0 | 26.0 | 28.0 |
| Tensile, dry (kg/3 cm) | 13.4 | 13.9 | 14.0 | 14.5 | 14.3 |
| Tensile, wet (kg/3 cm) | 1.6 | 4.3 | 7.0 | 7.2 | 6.4 |
| 3M KIT | <3 | 6.0 | 6.0 | 7.0 | 7.0 |
| Coefficient of Friction | 19.2 | 15.0 | 12.8 | 12.8 | 11.3 |
| Gloss | 2.1/1.9 | 2.0/2.0 | 2.8/2.5 | 2.5/2.5 | 2.7/2.7 |

EXAMPLE 4

250 milliliters of Hercules Advantage Defoamer were added to 1100 gallons of water. In the make-up tank, 667 pounds of Vinol 425 were dissolved in the water and allowed sufficient time for mixing. The mixture was then heated with live steam to 200 degrees Fahrenheit, and held with agitation at temperature for 45 minutes, following which 400 milliliters of a biocide (Nalco 7647 Biocide) was added. The steam was turned off and 220 gallons of Sequapel® 414G stearylated melamine with paraffin wax emulsion were added. The solution should not be heated with live steam after the fatty acid melamine and wax have been added, as the steam could potentially break down the emulsions. The solution was then diluted with water to a final volume of 2,000 gallons. It was applied at the size press inside the temperature range of 120–140 degrees Fahrenheit.

EXAMPLE 5

A sheet of paper was prepared utilizing conventional paper-making procedures. The sheet of paper had a basis weight of 37 g/m$^2$ and contained no filler. Polyvinyl alcohol from Air Products in combination with stearylated melamine (Sequapel® 409), paraffin wax (Sequapel® 417), and a stearylated melamine with paraffin wax (Sequapel® 414G) were evaluated on paper (37 g/m$^2$ basis weight; no filler) that had been moderately refined. The polyvinyl alcohols evaluated varied in molecular weight and degree of hydrolysis, ranging from super hydrolyzed (Airvol 165) to intermediately hydrolyzed (Airvol 425) grades. The viscosity ranged from Medium (28–32 cps) to High (62–72 cps). The base paper Ecusta Reference RD 99016 was treated on a Pilot size press with the solutions described in Example 4. RD 99016 is an unfilled 37 g/m$^2$ moderately refined sheet without any wet end alkaline sizing additives.

Standard adhesion to backing tests were performed on each sample using an Instron Tensile tester peeling the samples from standard 3M 234 masking tape, and measuring the average peeling force in ounces per one inch width at a peel speed of 12 inches per minute. Each test sample had the 3M 234 tape rolled down onto it a constant weight at 12 inches per minute. Tests were performed on samples at TAPPI standard conditions (25 degrees Celsius, 50% relative humidity) and also with a heated steel bar at 250 degrees Fahrenheit placed on the 3M 234 tape/paper sandwich for two minutes. This heated test simulates the release property of a release paper in extreme conditions.

As shown in Table 5, the results suggest that the Airvol 425 with the Sequapel® 414G stearylated melamine with paraffin wax gave the best results in both ambient and heated conditions. The Sequapel® 409 stearylated melamine gave the best result in ambient conditions but had the worst results with the heated test. The Sequapel® 417 paraffin wax had the worst result in ambient conditions but did the best in heated conditions. The Sequapel® 414G combined the best of both worlds, providing a release property to the RD 99016 paper without an alkaline sizing additive.

TABLE 5

Standard Adhesion to Backing Tests Using an Instron Tensile Tester Sample RD 99016 (using standard 3M 234 masking tape)

| Coating Composition | Cold Peel Test (oz/inch) | Hot Bar Peel (oz/inch) |
|---|---|---|
| 26.4 gpL Borated Airvol 165 | 19.8 | |
| 175 gpL Sequapel 414G | 14.2 | 18.3 |
| 26.4 gpL Borated Airvol 165, 100 gpL Sequapel 414G | 14.8 | |
| 100 gpL Hercon 80 first, then 26.4 gpL Borated Airvol 165, 100 gpL Sequapel 414G | 14.0 | |
| 100 gpL Hercon 80 | 16.2 | |
| 175 gpL Sequapel 409 | 10.9 | 19.2 |
| 6.0 gpL Kelgin LV, acidified | 21.5 | |
| 26.4 gpL Airvol 165, acidified | 21.7 | |
| 26.4 gpL Airvol 425, 175 gpL Sequapel 414G | 16.4 | |
| 100 gpL Hercon 80 first, then 26.4 gpL Airvol 425, 175 gpL Sequapel 414G | 15.0 | 16.7 |
| 26.4 gpL Airvol 425, 100 gpL Sequapel 409 | 11.6 | 21.5 |
| 26.4 gpL Airvol 425, acidified | 20.5 | |

EXAMPLE 6

A continuous web of paper was prepared using a standard fourdrinier paper machine. Critical parameters for this paper machine trial include porosity, coefficient of friction/slip and water holdout, in addition to release properties for the consumer end use. Release property will be controlled by the wet end alkaline sizing additive and the size press solution. Once again a paper suitable for use for release purposes was produced.

EXAMPLE 7

It has recently been discovered that sodium carboxymethylcellulose may be substituted for the polyvinyl alcohol component and yield similar results as far as improved oil and grease resistance. A formulation containing 40.05 g Airvol 425 was spot tested with cold corn oil, and failed at 45 seconds. The same formulation was also spot tested with castor oil, and failed at 30 minutes. The formulation had a KIT value of 4. Two separate formulations were then subjected to the same tests, each formulation having 40.05 g sodium carboxymethylcellulose in place of the Airvol 425. One of the formulations failed the cold corn oil spot test at 60 seconds, the castor oil spot test at 45 seconds and had a KIT value of 6, while the other failed at 5 seconds and 5 seconds, respectively, and had a KIT value of 2. The latter of the two formulations utilizing sodium carboxymethylcellulose did not contain any Sequapel 414G or Sunkem 301, where as the former of the two formulations contianed 52.5 mL of Sequapel 414G and 10.0 mL of Sunkem 301.

The present invention may be embodied in other specific forms without departing from its spirit or essential attributes, and the foregoing specification should not be construed as limiting in any way the scope of the invention.

While the invention has been described in terms of preferred embodiments, the skilled artisan will appreciate that various modifications, substitutions, omissions and changes may be made without departing from the spirit thereof.

Accordingly, it is intended that the scope of the present invention be limited solely by the scope of the following claims, including equivalents thereof.

What is claimed is:

1. An oil and grease resistant formulation comprising: a. polyvinyl alcohol and b. a fatty-acid melamine wax, wherein said polyvinyl alcohol comprises from about 40 to about 90 percent by weight and said fatty-acid melamine wax comprises from about 10 to about 60 percent by weight, based on the total weight of said formulation.

2. The formulation of claim 1, wherein said polyvinyl alcohol comprises from about 60 to about 80 percent by weight and said fatty-acid melamine wax comprises from about 20 to about 40 percent by weight, based on the total weight of said formulation.

3. An oil and grease resistant material comprising: a. a substrate; and b. a formulation applied to said substrate, said formulation comprising polyvinyl alcohol and a fatty-acid melamine wax, wherein said polyvinyl alcohol comprises from about 40 to about 90 percent by weight and said fatty-acid melamine wax comprises from about 10 to about 60 percent by weight, based on the total weight of said formulation.

4. The oil and grease resistant material of claim 3, wherein said polyvinyl alcohol comprises from about 60 to about 80 percent by weight and said fatty-acid melamine wax comprises from about 20 to about 40 percent by weight, based on the total weight of said formulation.

5. An oil and grease resistant material for use in forming a food wrapper, container or receptacle, said oil and grease resistant material comprising: a. fibrous sheet; and b. a formulation applied to said fibrous sheet, said formulation comprising polyvinyl alcohol and a fatty-acid melamine wax, wherein said polyvinyl alcohol comprises from about 40 to about 90 percent by weight and said fatty-acid melamine wax comprises from about 10 to about 60 percent by weight, based on the total weight of said formulation.

6. The oil and grease resistant material of claim 5, wherein said polyvinyl alcohol comprises from about 60 to about 80 percent by weight and said fatty-acid melamine wax comprises from about 20 to about 40 percent by weight, based on the total weight of said formulation.

7. A shaped article comprising an oil and grease resistant material, said shaped article comprising: a. a substrate; and b. a formulation applied to said substrate to form said oil and grease resistant material, said formulation comprising polyvinyl alcohol and a fatty-acid melamine wax, wherein said polyvinyl alcohol comprises from about 40 to about 90 percent by weight and said fatty-acid melamine wax comprises from about 10 to about 60 percent by weight, based on the total weight of said formulation.

8. The shaped article of claim 7, wherein said polyvinyl alcohol comprises from about 60 to about 80 percent by weight and said fatty-acid melamine wax comprises from about 20 to about 40 percent by weight, based on the total weight of said formulation.

9. A method of making an oil and grease resistant material, said method comprising the application of a formulation to a substrate, wherein said formulation comprises polyvinyl alcohol and a fatty-acid melamine wax, wherein said polyvinyl alcohol comprises from about 40 to about 90 percent by weight and said fatty-acid melamine wax comprises from about 10 to about 60 percent by weight, based on the total weight of said formulation.

10. The method of claim 9, wherein said polyvinyl alcohol comprises from about 60 to about 80 percent by weight and said fatty-acid melamine wax comprises from about 20 to about 40 percent by weight, based on the total weight of said formulation.

11. A method of making a food wrapper, container or receptacle, said method comprising the steps of: a applying a formulation to a fibrous sheet to form an oil and grease resistant material, wherein said polyvinyl alcohol comprises from about 40 to about 90 percent by weight and said fatty-acid melamine wax comprises from about 10 to about 60 percent by weight, based on the total weight of said formulation.

12. The method of claim 11, wherein said polyvinyl alcohol comprises from about 60 to about 80 percent by weight and said fatty-acid melamine wax comprises from about 20 to about 40 percent by weight, based on the total weight of said formulation.

13. A method of making a shaped article, said method comprising the steps of: a. applying a formulation to a substrate to form an oil and grease resistant material, wherein said polyvinyl alcohol comprises from about 40 to about 90 percent by weight and said fatty-acid melamine wax comprises from about 10 to about 60 percent by weight, based on the total weight of said formulation.

14. The method of claim 13, wherein said polyvinyl alcohol comprises from about 60 to about 80 percent by weight and said fatty-acid melamine wax comprises from about 20 to about 40 percent by weight, based on the total weight of said formulation.

15. A method of protecting a food-contacting surface from penetration by oil and grease, said method comprising the application of a formulation on the food-contacting surface of a paper sheet comprising cellulose for use in a food wrapper, receptacle or container, wherein said polyvinyl alcohol comprises from about 40 to about 90 percent by weight and said fatty-acid melamine wax comprises from about 10 to about 60 percent by weight, based on the total weight of said formulation.

16. The method of claim 15, wherein said polyvinyl alcohol comprises from about 60 to about 80 percent by weight and said fatty-acid melamine wax comprises from about 20 to about 40 percent by weight, based on the total weight of said formulation.

* * * * *